(12) United States Patent
Golthi

(10) Patent No.: US 12,032,971 B2
(45) Date of Patent: Jul. 9, 2024

(54) ELECTRONIC SYSTEM FOR DYNAMICALLY RECONFIGURING ELECTRONIC APPLICATIONS BASED ON USER REQUESTS

(71) Applicant: BANK OF AMERICA CORPORATION, Charlotte, NC (US)

(72) Inventor: Rama Venkata Siva Kumar Golthi, Tamil Nadu (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 638 days.

(21) Appl. No.: 17/243,789

(22) Filed: Apr. 29, 2021

(65) Prior Publication Data
US 2022/0350788 A1    Nov. 3, 2022

(51) Int. Cl.
*G06F 9/445*    (2018.01)
*G06F 9/50*    (2006.01)
*G06F 9/54*    (2006.01)

(52) U.S. Cl.
CPC ........ *G06F 9/44505* (2013.01); *G06F 9/5005* (2013.01); *G06F 9/547* (2013.01); *G06F 2209/5015* (2013.01)

(58) Field of Classification Search
CPC .... G06F 9/44505; G06F 9/5005; G06F 9/547; G06F 2209/5015
See application file for complete search history.

(56) References Cited

U.S. PATENT DOCUMENTS

| | | | |
|---|---|---|---|
| 8,321,294 B2 | 11/2012 | Carlier et al. | |
| 8,719,094 B1 | 5/2014 | Klein et al. | |
| 8,898,806 B1 * | 11/2014 | Manmohan | H04L 63/0807 |
| | | | 713/172 |
| 8,983,858 B2 | 3/2015 | Evans et al. | |
| 10,147,086 B2 | 12/2018 | Teuwen et al. | |
| 10,685,345 B2 | 6/2020 | Hunt | |
| 10,728,728 B2 | 7/2020 | Levionnais et al. | |
| 10,924,347 B1 * | 2/2021 | Narsian | H04L 47/12 |
| 11,295,549 B1 | 4/2022 | Yadav et al. | |
| 11,436,830 B2 | 9/2022 | Krishnamoorthy | |
| 11,526,822 B2 | 12/2022 | Kochar et al. | |

(Continued)

*Primary Examiner* — Kevin L Young
*Assistant Examiner* — Phuong N Hoang
(74) *Attorney, Agent, or Firm* — Moore & Van Allen PLLC; R. W. McCord Rayburn

(57) ABSTRACT

Systems, computer program products, and methods are described herein for dynamically reconfiguring electronic applications based on user requests. The present invention may be configured to analyze multiple applications to determine configurations, programming interfaces, functions, and data formats of each application of the applications and receive payload data, where the payload data is based on a user request, and where the user request includes a user identifier associated with a user that provided the user request and information identifying an engineering request. The present invention may be further configured to determine, based on the payload data, an application, of the applications, for performing the engineering request and convert the payload data to a data format, of the data formats, for the application to obtain converted data. The present invention may be further configured to perform, on the application and based on the converted data, the engineering request.

20 Claims, 3 Drawing Sheets

(56) References Cited

U.S. PATENT DOCUMENTS

| | | | |
|---|---|---|---|
| 2014/0108792 A1* | 4/2014 | Borzycki | H04L 67/63 |
| | | | 713/165 |
| 2014/0298490 A1* | 10/2014 | Clark | G06Q 10/105 |
| | | | 726/34 |
| 2016/0337206 A1* | 11/2016 | Bugenhagen | H04L 67/02 |
| 2018/0278471 A1* | 9/2018 | Burli | G06F 9/451 |
| 2019/0364081 A1* | 11/2019 | Valenzuela | H04L 65/762 |
| 2020/0005304 A1 | 1/2020 | Almers et al. | |
| 2020/0177474 A1* | 6/2020 | Nijhawan | G06F 9/44505 |
| 2020/0280609 A1* | 9/2020 | Fong | H04W 4/38 |
| 2020/0294093 A1 | 9/2020 | Huong Ly | |
| 2020/0349776 A1 | 11/2020 | Yeung et al. | |
| 2020/0410500 A1 | 12/2020 | Dorogusker | |
| 2021/0287209 A1 | 9/2021 | Nelluri | |
| 2022/0276919 A1 | 9/2022 | Kavali et al. | |

* cited by examiner

ELECTRONIC SYSTEM FOR DYNAMICALLY RECONFIGURING ELECTRONIC APPLICATIONS BASED ON USER REQUESTS

FIELD OF THE INVENTION

The present invention embraces an electronic system for dynamically reconfiguring electronic applications based on user requests.

BACKGROUND

A user may use a plurality of applications to store data, maintain data, repair data, access data, execute processes, perform maintenance, access systems, and/or the like. The applications may include multiple configurations, operations, engineering functionalities, and/or the like.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, system for dynamically reconfiguring electronic applications based on user requests is presented. The system may include at least one non-transitory storage device and at least one processing device coupled to the at least one non-transitory storage device, where the at least one processing device may be configured to analyze multiple applications to determine configurations, programming interfaces, functions, and data formats of each application of the applications. The at least one processing device may be configured to receive payload data, where the payload data is based on a user request, and where the user request includes a user identifier associated with a user that provided the user request and information identifying an engineering request. The at least one processing device may be configured to determine, based on the payload data, an application, of the applications, for performing the engineering request and convert the payload data to a data format, of the data formats, for the application to obtain converted data. The at least one processing device may be configured to perform, on the application and based on the converted data, the engineering request.

In some embodiments, the engineering request may include information identifying a configuration of the configurations.

In some embodiments, the engineering request may include information identifying a function of the functions.

In some embodiments, the at least one processing device may be configured to store the configurations, programming interfaces, functions, and data formats of each application of the applications in a data structure. Additionally, or alternatively, the at least one processing device may be configured to, when determining the application for performing the engineering request, determine the application for performing the engineering request based on the payload data and data in the data structure. In some embodiments, the at least one processing device may be configured to, when converting the payload data, covert the payload data based on data in the data structure.

In some embodiments, the engineering request may include a request to change a configuration of the application, and the at least one processing device may be configured to, when performing the engineering request, change the configuration of the application.

In some embodiments, the engineering request may include a request to provide the user with access to the application, and the at least one processing device may be configured to, when performing the engineering request, change a configuration of application to provide the user with access to the application.

In some embodiments, the at least one processing device may be configured to perform the engineering request on the application via a programming interface of the programming interfaces.

In some embodiments, the at least one processing device may be configured to map the engineering request to an aggregator.

In some embodiments, the user request may include information identifying multiple engineering requests, and the at least one processing device may be configured to map the engineering requests to an aggregator and consolidate, with the aggregator, the engineering requests.

In some embodiments, the at least one processing device may be configured to decode the converted data.

In another aspect, a computer program product for dynamically reconfiguring electronic applications based on user requests is presented. The computer program product may include a non-transitory computer-readable medium including code causing a first apparatus to analyze multiple applications to determine configurations, programming interfaces, functions, and data formats of each application of the applications. The computer program product may include a non-transitory computer-readable medium including code causing the first apparatus to receive payload data, where the payload data is based on a user request, and where the user request includes a user identifier associated with a user that provided the user request and information identifying an engineering request. The computer program product may include a non-transitory computer-readable medium including code causing the first apparatus to determine, based on the payload data, an application, of the applications, for performing the engineering request and convert the payload data to a data format, of the data formats, for the application to obtain converted data. The computer program product may include a non-transitory computer-readable medium including code causing the first apparatus to perform, on the application and based on the converted data, the engineering request.

In some embodiments, the engineering request may include information identifying a configuration of the configurations.

In some embodiments, the engineering request may include information identifying a function of the functions.

In some embodiments, the non-transitory computer-readable medium may include code causing the first apparatus to store the configurations, programming interfaces, functions, and data formats of each application of the applications in a data structure. Additionally, or alternatively, the non-transitory computer-readable medium may include code causing the first apparatus to, when determining the application for performing the engineering request, determine the application for performing the engineering request based on the payload data and data in the data structure. In some embodiments, the non-transitory computer-readable medium may include code causing the first apparatus to, when converting the payload data, covert the payload data based on data in the data structure.

In some embodiments, the engineering request may include a request to change a configuration of the application, and the non-transitory computer-readable medium may include code causing the first apparatus to, when performing the engineering request, change the configuration of the application.

In yet another aspect, a method for dynamically reconfiguring electronic applications based on user requests is presented. The method may include analyzing multiple applications to determine configurations, programming interfaces, functions, and data formats of each application of the applications. The method may include receiving payload data, where the payload data is based on a user request, and where the user request includes a user identifier associated with a user that provided the user request and information identifying an engineering request. The method may include determining, based on the payload data, an application, of the applications, for performing the engineering request. The method may include converting the payload data to a data format, of the data formats, for the application to obtain converted data. The method may include performing, on the application and based on the converted data, the engineering request.

The features, functions, and advantages that have been discussed may be achieved independently in various embodiments of the present invention or may be combined with yet other embodiments, further details of which may be seen with reference to the following description and drawings.

BRIEF DESCRIPTION OF THE DRAWINGS

Figure 1:
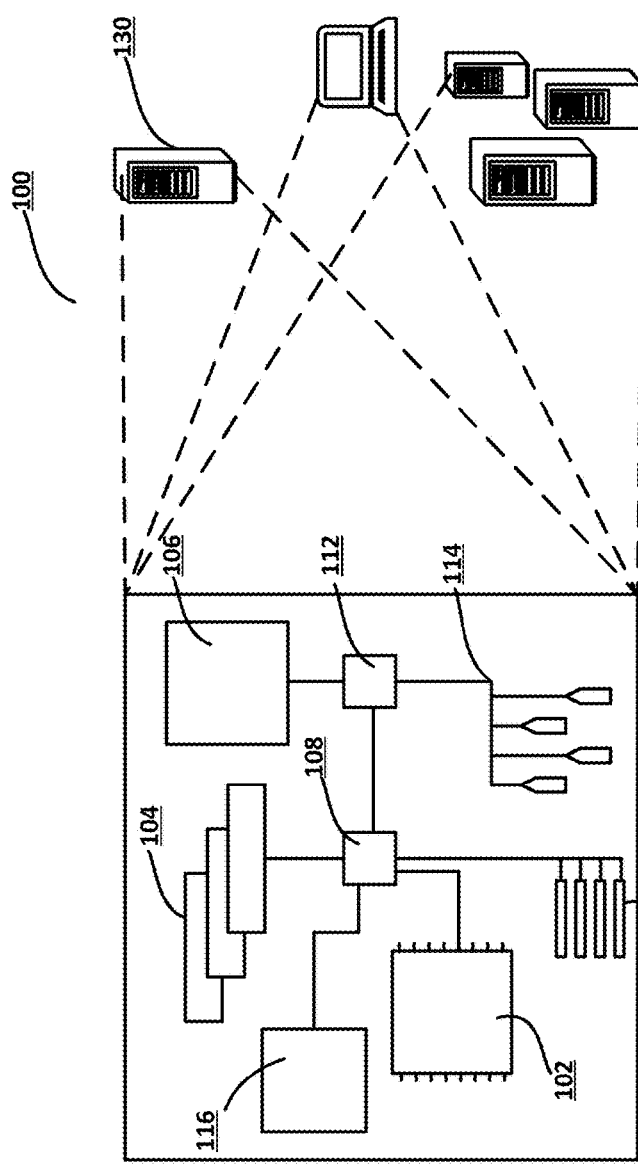
Figure 1:
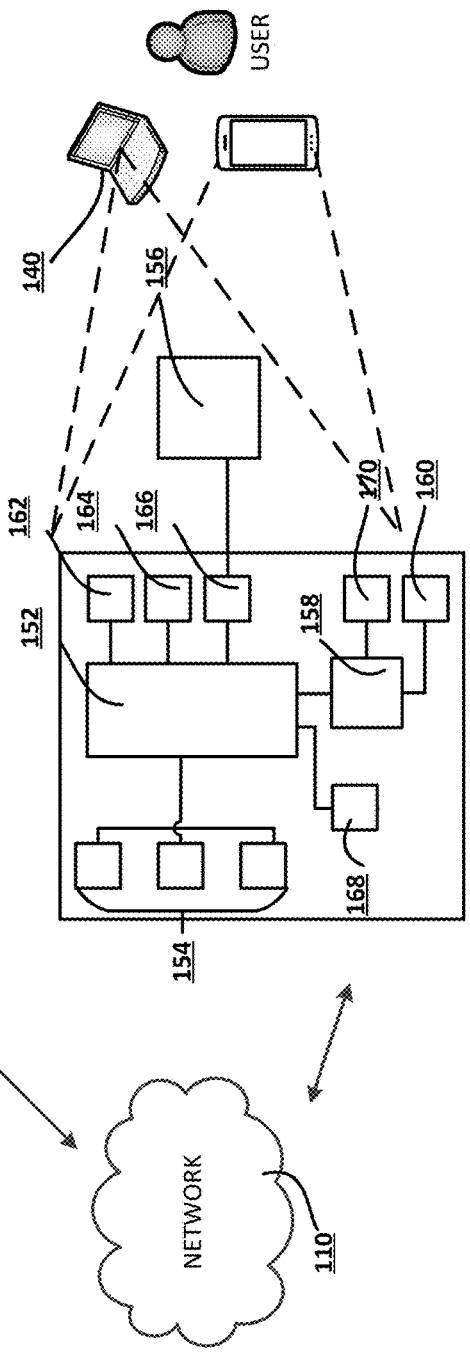
Figure 2:
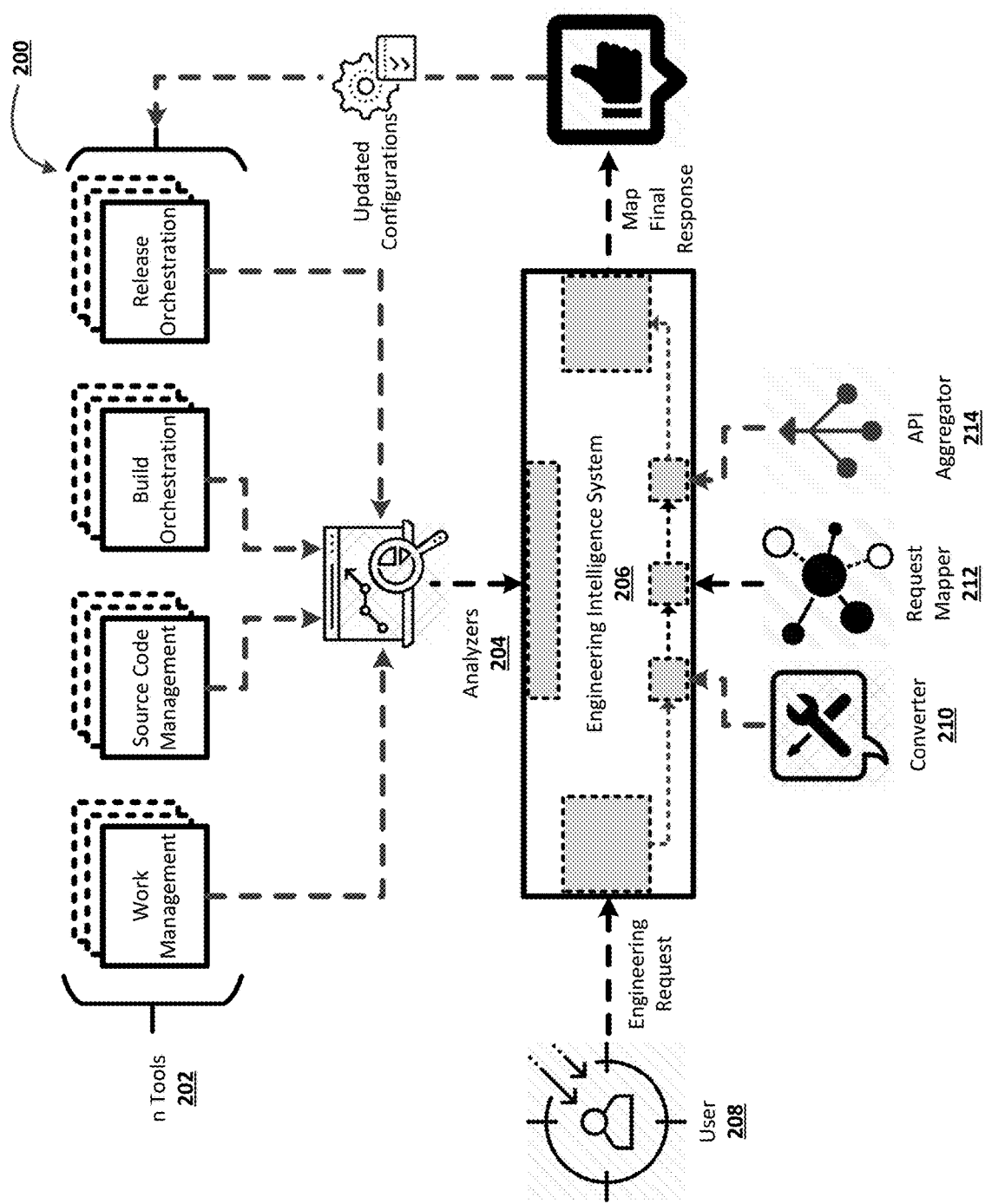
Figure 3:
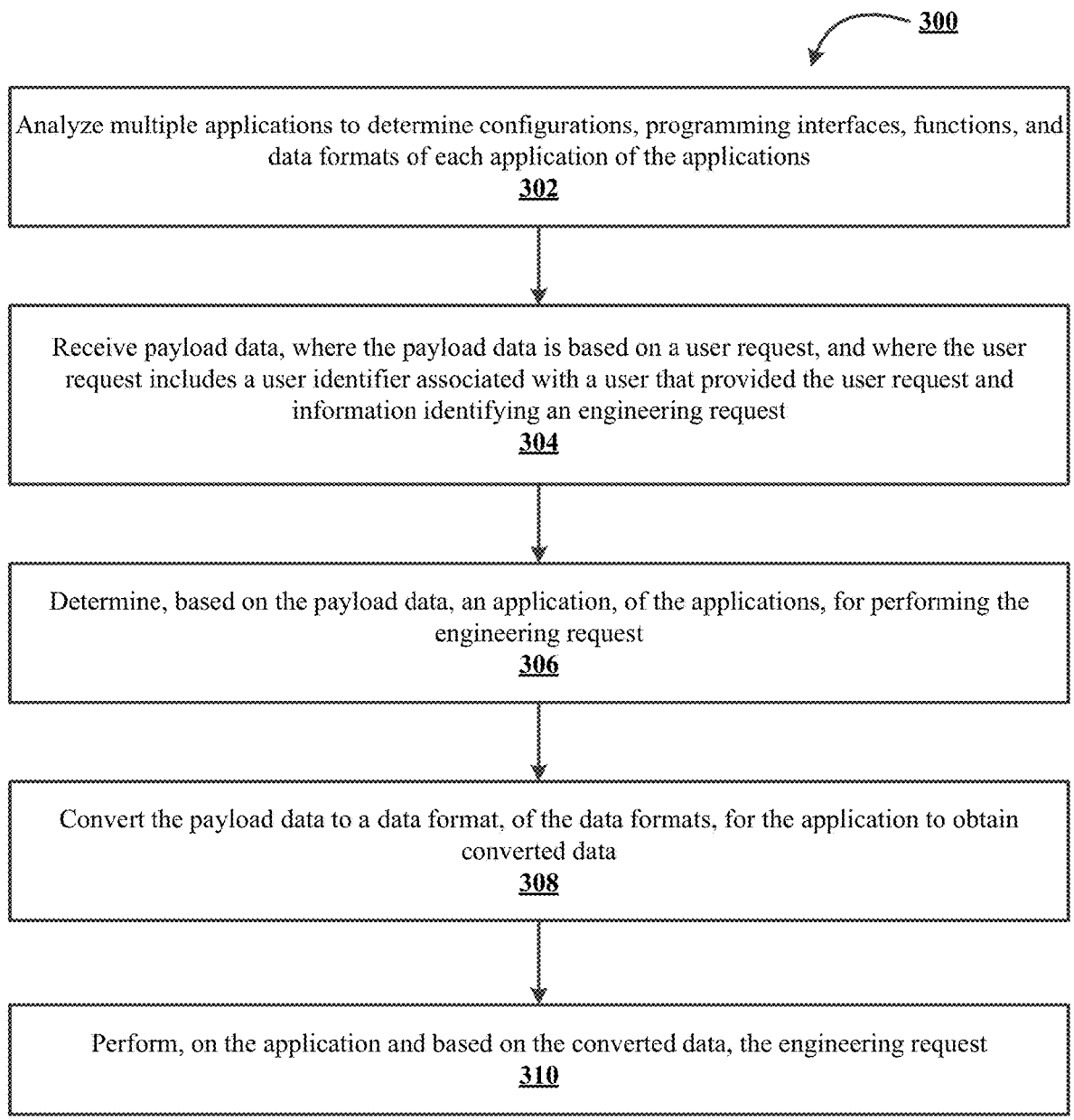

Having thus described embodiments of the invention in general terms, reference will now be made the accompanying drawings, wherein:

FIG. 1 illustrates technical components of a system for dynamically reconfiguring electronic applications based on user requests, in accordance with an embodiment of the invention;

FIG. 2 illustrates a process flow for dynamically reconfiguring electronic applications based on user requests, in accordance with an embodiment of the invention; and FIG. 3 illustrates a process flow for dynamically reconfiguring electronic applications based on user requests, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As noted, a user may use a plurality of applications to store data, maintain data, repair data, access data, execute processes, perform maintenance, access systems, and/or the like. The applications may include multiple configurations, operations, engineering functionalities, and/or the like. However, the user may lack the knowledge, training, expertise, and/or the like to manage the configurations, operations, engineering functionalities, and/or the like of the applications. Accordingly, the user may request assistance from one or more other users to manage, change, administer, and/or the like the configurations, operations, engineering functionalities, and/or the like of the applications. Furthermore, when multiple users use the applications, the users may provide many requests for assistance to the other users with the knowledge, training, expertise, and/or the like to manage the configurations, operations, engineering functionalities, and/or the like of the applications. Such requests, processing such requests, and performing such requests consumes significant resources (e.g., financial resources, computing resources, network resources, and/or the like).

Some embodiments described herein provide a system, a computer program product, and/or a method for dynamically reconfiguring electronic applications based on user requests. For example, a system (e.g., an electronic system for dynamically reconfiguring electronic applications based on user requests and/or the like) may be configured to use analyzers, converters, aggregators, and/or the like to analyze the applications to determine the configurations, operations, engineering functionalities, and/or the like of the applications, receive requests from users, process the requests to determine applications associated with the requests and convert data in the requests to appropriate formats, and map the requests to update the applications. By receiving the requests, processing the requests, and mapping the requests to update the applications, the system may conserve resources (e.g., financial resources, computing resources, network resources, and/or the like) that would otherwise be consumed by multiple users providing requests for assistance to other users and the other users processing the requests and performing the requests.

As used herein, an "entity" may be any institution employing information technology resources and particularly technology infrastructure configured for processing large amounts of data. Typically, the data may be related to products, services, and/or the like offered and/or provided by the entity, customers of the entity, other aspect of the operations of the entity, people who work for the entity, and/or the like. As such, the entity may be an institution, group, association, financial institution, establishment, company, union, authority, merchant, service provider, and/or or the like, employing information technology resources for processing large amounts of data.

As used herein, a "user" may be an individual associated with an entity. As such, in some embodiments, the user may be an individual having past relationships, current relationships or potential future relationships with an entity. In some embodiments, a "user" may be an employee (e.g., an associate, a project manager, a manager, an administrator, an internal operations analyst, and/or the like) of the entity and/or enterprises affiliated with the entity, capable of operating systems described herein. In some embodiments, a "user" may be any individual, another entity, and/or a system who has a relationship with the entity, such as a customer, a prospective customer, and/or the like. In some embodiments, a user may be a system performing one or more tasks described herein.

As used herein, a "user interface" may be any device or software that allows a user to input information, such as commands and/or data, into a device, and/or that allows the device to output information to the user. For example, a user interface may include an application programmer interface (API), a graphical user interface (GUI), and/or an interface to input computer-executable instructions that direct a processing device to carry out functions. The user interface may employ input and/or output devices to input data received from a user and/or output data to a user. Input devices and/or output devices may include a display, API, mouse, keyboard, button, touchpad, touch screen, microphone, speaker, LED, light, joystick, switch, buzzer, bell, and/or other devices for communicating with one or more users.

As used herein, a "resource" may generally refer to objects, products, devices, goods, commodities, services, offers, discounts, currency, cash, cash equivalents, rewards, reward points, benefit rewards, bonus miles, cash back, credits, and/or the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, and/or the like.

As used herein, a "source retainer" may generally refer to an account, a system, and/or the like associated with a user and/or a type of resources, such as software, a checking account, a deposit account, a savings account, a credit account, a rewards account, a rewards points account, a benefit rewards account, a bonus miles account, a cash back account, and/or the like, which may be managed and/or maintained by an entity, such as a financial institution, an electronic resource transfer institution (e.g., a credit card company, a debit card company, a prepaid card company, and/or the like), a credit union, and/or the like.

As used herein, a "distribution" and/or an "allocation" may refer to any transaction, activities, and/or communication between one or more entities, between a user and one or more entities, and/or the like. A resource distribution and/or an allocation of resources may refer to any distribution of resources such as, but not limited to, a payment, processing of funds, purchase of goods or services, a return of goods or services, a payment transaction, a credit transaction, other interactions involving a user's resource or account, and/or the like. In the context of an entity such as a financial institution, a resource distribution and/or an allocation of resources may refer to one or more of a sale of goods and/or services, initiating an automated teller machine (ATM) or online financial session, an account balance inquiry, a rewards transfer, an account money transfer or withdrawal, opening a financial application on a user's computer or mobile device, a user accessing their e-wallet, any other interaction involving the user and/or the user's device that invokes and/or is detectable by the financial institution, and/or the like. In some embodiments, the user may authorize a resource distribution and/or an allocation of resources using a resource distribution instrument (e.g., credit cards, debit cards, checks, digital wallets, currency, loyalty points, and/or the like) and/or resource distribution credentials (e.g., account numbers, resource distribution instrument identifiers, and/or the like). A resource distribution and/or an allocation of resources may include one or more of the following: renting, selling, and/or leasing goods and/or services (e.g., groceries, stamps, tickets, DVDs, vending machine items, and/or the like); making payments to creditors (e.g., paying monthly bills; paying federal, state, and/or local taxes, and/or the like); sending remittances; loading money onto stored value cards (SVCs) and/or prepaid cards; donating to charities; and/or the like. Unless specifically limited by the context, a "resource distribution," an "allocation of resources," a "resource transfer," a "transaction," a "transaction event," and/or a "point of transaction event" may refer to any activity between a user, a merchant, an entity, and/or the like. In some embodiments, a resource distribution and/or an allocation of resources may refer to financial transactions involving direct or indirect movement of funds through traditional paper transaction processing systems (e.g., paper check processing) or through electronic transaction processing systems. In this regard, resource distributions and/or allocations of resources may refer to the user initiating a purchase for a product, service, or the like from a merchant. Typical financial resource distribution and/or financial allocations of resources include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points, and/or the like. When describing that resource transfers or transactions are evaluated, such descriptions may mean that the transaction has already occurred, is in the process of occurring or being processed, or has yet to be processed/posted by one or more financial institutions.

As used herein, "resource distribution instrument" may refer to an electronic payment vehicle, such as an electronic credit, debit card, and/or the like, associated with a source retainer (e.g., a checking account, a deposit account, a savings account, a credit account, and/or the like). In some embodiments, the resource distribution instrument may not be a "card" and may instead be account identifying information stored electronically in a user device, such as payment credentials and/or tokens and/or aliases associated with a digital wallet, account identifiers stored by a mobile application, and/or the like.

In some embodiments, the term "module" with respect to an apparatus may refer to a hardware component of the apparatus, a software component of the apparatus, and/or a component of the apparatus that includes both hardware and software. In some embodiments, the term "chip" may refer to an integrated circuit, a microprocessor, a system-on-a-chip, a microcontroller, and/or the like that may either be integrated into the external apparatus, may be inserted and/or removed from the external apparatus by a user, and/or the like.

As used herein, an "engine" may refer to core elements of a computer program, part of a computer program that serves as a foundation for a larger piece of software and drives the functionality of the software, and/or the like. An engine may be self-contained but may include externally controllable code that encapsulates powerful logic designed to perform or execute a specific type of function. In one aspect, an engine may be underlying source code that establishes file hierarchy, input and/or output methods, how a part of a computer program interacts and/or communicates with other software and/or hardware, and/or the like. The components of an engine may vary based on the needs of the computer program as part of the larger piece of software. In some embodiments, an engine may be configured to retrieve resources created in other computer programs, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

As used herein, a "component" of an application may include a software package, a service, a resource, a module, and/or the like that includes a set of related functions and/or data. In some embodiments, a component may provide a source capability (e.g., a function, a business function, and/or the like) to an application including the component. In some embodiments, components of an application may communicate with each other via interfaces and may provide information to each other indicative of the services and/or functions that other components may utilize and/or how other components may utilize the services and/or functions. Additionally, or alternatively, components of an application may be substitutable such that a component may replace another component. In some embodiments, components may include objects, collections of objects, and/or the like.

As used herein, "authentication credentials" may be any information that may be used to identify a user. For example, a system may prompt a user to enter authentication information such as a username, a password, a token, a personal identification number (PIN), a passcode, biometric information (e.g., voice authentication, a fingerprint, and/or a retina scan), an answer to a security question, a unique intrinsic user activity, such as making a predefined motion with a user device, and/or the like. The authentication information may be used to authenticate the identity of the user (e.g., determine that the authentication information is associated with an account) and/or determine that the user has authority to access an account or system. In some embodiments, the system may be owned and/or operated by an entity. In such embodiments, the entity may employ additional computer systems, such as authentication servers, to validate and certify resources inputted by a plurality of users within the system. The system may further use authentication servers to certify the identity of users of the system, such that other users may verify the identity of the certified users. In some embodiments, the entity may certify the identity of the users. Furthermore, authentication information and/or permission may be assigned to and/or required from a user, application, computing node, computing cluster, and/or the like to access stored data within at least a portion of the system.

As used herein, an "interaction" may refer to any communication between one or more users, one or more entities or institutions, and/or one or more devices, nodes, clusters, and/or systems within the system environment described herein. For example, an interaction may refer to a transfer of data between devices, an accessing of stored data by one or more nodes of a computing cluster, a transmission of a requested task, and/or the like. In some embodiments, an interaction may refer to an entity, a user, a system, and/or a device providing an advertisement, information, data, a user interface, and/or the like to another entity, another user, another system, and/or another device.

FIG. 1 presents an exemplary block diagram of a system environment 100 for dynamically reconfiguring electronic applications based on user requests within a technical environment, in accordance with an embodiment of the invention. FIG. 1 provides a system environment 100 that includes specialized servers and a system communicably linked across a distributive network of nodes required to perform functions of process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device, a non-mobile computing device, and/or the like. The user may be a person who uses the user input system 140 to access, view modify, interact with, and/or the like information, data, images, video, and/or the like. The user may be a person who uses the user input system 140 to initiate, perform, monitor, and/or the like changes and/or modifications to one or more systems, applications, services, and/or the like. The one or more systems, applications, services, and/or the like may be configured to communicate with the system 130, input information onto a user interface presented on the user input system 140, and/or the like. The applications stored on the user input system 140 and the system 130 may incorporate one or more parts of any process flow described herein.

As shown in FIG. 1, the system 130 and the user input system 140 are each operatively and selectively connected to the network 110, which may include one or more separate networks. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology.

In some embodiments, the system 130 and the user input system 140 may be used to implement processes described herein, including user-side and server-side processes for dynamically reconfiguring electronic applications based on user requests, in accordance with an embodiment of the present invention. The system 130 may represent various forms of digital computers, such as laptops, desktops, workstations, personal digital assistants, servers, blade servers, mainframes, and/or the like. The user input system 140 may represent various forms of mobile devices, such as personal digital assistants, cellular telephones, smartphones, smart glasses, and/or the like. The components shown here, their connections, their relationships, and/or their functions, are meant to be exemplary only, and are not meant to limit implementations of the inventions described and/or claimed in this document.

In some embodiments, the system 130 may include a processor 102, memory 104, a storage device 106, a high-speed interface 108 connecting to memory 104, high-speed expansion ports 111, and a low-speed interface 112 connecting to low-speed bus 114 and storage device 106. Each of the components 102, 104, 106, 108, 111, and 112 may be interconnected using various buses, and may be mounted on a common motherboard or in other manners as appropriate. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130 may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The memory 104 may store information within the system 130. In one implementation, the memory 104 may be a volatile memory unit or units, such as volatile random-access memory (RAM) having a cache area for the temporary storage of information. In another implementation, the memory 104 may be a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 may be capable of providing mass storage for the system 130. In one aspect, the storage device 106 may be or contain a computer-readable medium, such as a floppy disk device, a hard disk device, an optical disk device, a tape device, a flash memory and/or other similar solid state memory device, and/or an array of devices, including devices in a storage area network or other configurations. A computer program product may be tangibly embodied in an information carrier. The computer program product may also contain instructions that, when executed, perform one or more methods, such as those described herein. The information carrier may be a non-transitory computer-readable or machine-readable storage medium, such as the memory 104, the storage device 106, and/or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 may manage bandwidth-intensive operations for the system 130, while the low-speed interface 112 and/or controller manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In some embodiments, low-speed interface 112 and/or controller is coupled to storage device 106 and low-speed bus 114 (e.g., expansion port). The low-speed bus 114, which may include various communication ports (e.g., USB, Bluetooth, Ethernet, wireless Ethernet), may be coupled to one or more input/output devices, such as a keyboard, a pointing device, a scanner, and/or a networking device such as a switch or router (e.g., through a network adapter).

The system 130 may be implemented in a number of different forms, as shown in FIG. 1. For example, it may be implemented as a standard server or multiple times in a group of such servers. Additionally, or alternatively, the system 130 may be implemented as part of a rack server system, a personal computer, such as a laptop computer, and/or the like. Alternatively, components from system 130 may be combined with one or more other same or similar systems and the user input system 140 may be made up of multiple computing devices communicating with each other.

FIG. 1 also illustrates a user input system 140, in accordance with an embodiment of the invention. The user input system 140 may include a processor 152, memory 154, an input/output device such as a display 156, a communication interface 158, and a transceiver 160, among other components, such as one or more image sensors. The user input system 140 may also be provided with a storage device, such as a microdrive and/or the like, to provide additional storage. Each of the components 152, 154, 158, and 160, may be interconnected using various buses, and several of the components may be mounted on a common motherboard or in other manners as appropriate.

The processor 152 may be configured to execute instructions within the user input system 140, including instructions stored in the memory 154. The processor 152 may be implemented as a chipset of chips that include separate and multiple analog and/or digital processors. The processor 152 may be configured to provide, for example, for coordination of the other components of the user input system 140, such as control of user interfaces, applications run by user input system 140, and/or wireless communication by user input system 140.

The processor 152 may be configured to communicate with the user through control interface 164 and display interface 166 coupled to a display 156. The display 156 may be, for example, a Thin-Film-Transistor Liquid Crystal Display (TFT LCD) or an Organic Light Emitting Diode (OLED) display, and/or other appropriate display technology. An interface of the display 156 may include appropriate circuitry and may be configured for driving the display 156 to present graphical and other information to a user. The control interface 164 may receive commands from a user and convert them for submission to the processor 152. In addition, an external interface 168 may be provided in communication with processor 152 to enable near area communication of user input system 140 with other devices. External interface 168 may provide, for example, for wired communication in some implementations, or for wireless communication in other implementations, and multiple interfaces may also be used.

The memory 154 may store information within the user input system 140. The memory 154 may be implemented as one or more of a computer-readable medium or media, a volatile memory unit or units, or a non-volatile memory unit or units. Expansion memory may also be provided and connected to user input system 140 through an expansion interface (not shown), which may include, for example, a Single In Line Memory Module (SIMM) card interface. Such expansion memory may provide extra storage space for user input system 140 and/or may store applications and/or other information therein. In some embodiments, expansion memory may include instructions to carry out or supplement the processes described above and/or may include secure information. For example, expansion memory may be provided as a security module for user input system 140 and may be programmed with instructions that permit secure use of user input system 140. Additionally, or alternatively, secure applications may be provided via the SIMM cards, along with additional information, such as placing identifying information on the SIMM card in a secure manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In some embodiments, a computer program product may be tangibly embodied in an information carrier. The computer program product may contain instructions that, when executed, perform one or more methods, such as those described herein. The information carrier may be a computer-readable or machine-readable medium, such as the memory 154, expansion memory, memory on processor 152, and/or a propagated signal that may be received, for example, over transceiver 160 and/or external interface 168.

In some embodiments, the user may use the user input system 140 to transmit and/or receive information and/or commands to and/or from the system 130. In this regard, the system 130 may be configured to establish a communication link with the user input system 140, whereby the communication link establishes a data channel (wired and/or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, and/or the like.

The user input system 140 may communicate with the system 130 (and one or more other devices) wirelessly through communication interface 158, which may include digital signal processing circuitry. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker (e.g., in a handset) of user input system 140. Such sound may include sound from voice telephone calls, may include recorded sound (e.g., voice messages, music files, and/or the like) and may also include sound generated by one or more applications operating on the user input system 140, and in some embodiments, one or more applications operating on the system 130.

Various implementations of the systems and techniques described here may be realized in digital electronic circuitry, integrated circuitry, specially designed ASICs (application specific integrated circuits), computer hardware, firmware, software, and/or combinations thereof. Such various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and/or at least one output device.

Computer programs (e.g., also referred to as programs, software, applications, code, and/or the like) may include machine instructions for a programmable processor, and may be implemented in a high-level procedural and/or object-oriented programming language, and/or in assembly/machine language. As used herein, the terms "machine-readable medium" and/or "computer-readable medium" may refer to any computer program product, apparatus and/or device (e.g., magnetic discs, optical disks, memory, Programmable Logic Devices (PLDs), and/or the like) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and/or techniques described herein may be implemented on a computer having a display device (e.g., a CRT (cathode ray tube), an LCD (liquid crystal display) monitor, and/or the like) for displaying information to the user, a keyboard by which the user may provide input to the computer, and/or a pointing device (e.g., a mouse or a trackball) by which the user may provide input to the computer. Other kinds of devices may be used to provide for interaction with a user as well. For example, feedback provided to the user may be any form of sensory feedback (e.g., visual feedback, auditory feedback, and/or tactile feedback). Additionally, or alternatively, input from the user may be received in any form, including acoustic, speech, and/or tactile input.

The systems and techniques described herein may be implemented in a computing system that includes a back end component (e.g., as a data server), that includes a middleware component (e.g., an application server), that includes a front end component (e.g., a client computer having a graphical user interface or a Web browser through which a user may interact with an implementation of the systems and techniques described here), and/or any combination of such back end, middleware, and/or front end components. Components of the system may be interconnected by any form or medium of digital data communication (e.g., a communication network). Examples of communication networks include a local area network ("LAN"), a wide area network ("WAN"), and/or the Internet.

In some embodiments, computing systems may include clients and servers. A client and server may generally be remote from each other and typically interact through a communication network. The relationship of client and server may arise by virtue of computer programs running on the respective computers and having a client-server relationship to each other.

The embodiment of the system environment 100 illustrated in FIG. 1 is exemplary and other embodiments may vary. As another example, in some embodiments, the system 130 includes more, less, or different components. As another example, in some embodiments, some or all of the portions of the system environment 100, the system 130, and/or the user input system 140 may be combined into a single portion. Likewise, in some embodiments, some or all of the portions of the system environment 100, the system 130, and/or the user input system 140 may be separated into two or more distinct portions.

In some embodiments, the system environment may 100 include one or more user input systems and/or one or more tools engineering intelligence services systems (e.g., similar to the system 130 and/or the user input system 140) associated with an entity (e.g., a business, a merchant, a financial institution, a card management institution, an software and/or hardware development company, a software and/or hardware testing company, and/or the like). For example, a user (e.g., an employee, a customer, and/or the like) may use a user input system (e.g., similar to the user input system 140) to initiate a change and/or a modification to one or more of the systems, applications, services, and/or the like (e.g., similar to the system 130, running a system similar to the system 130, and/or the like). In some embodiments, the user input system and/or the tools engineering intelligence services systems associated with the entity may perform one or more of the steps described herein with respect to the process flow described herein with respect to FIGS. 2 and/or 3.

FIG. 2 illustrates a process flow 200 for dynamically reconfiguring electronic applications based on user requests within a technical environment, in accordance with an embodiment of the invention. In some embodiments, a tools engineering intelligence services system and/or the like (e.g., similar to one or more of the systems described herein with respect to FIG. 1) may perform one or more of the steps of process flow 200.

As shown in FIG. 2, the process flow 200 may include tools 202, analyzers 204, an engineering intelligence system 206, a user 208, a converter 210, a request mapper 212, and an API aggregator 214. In some embodiments, the engineering intelligence system 206 may be a tools engineering intelligence services system and may include the analyzers 204, the converter 210, the request mapper 212, and the API aggregator 214.

As shown in FIG. 2, the tools 202 may include multiple tools (e.g., applications, systems, and/or the like) and may include multiple types of tools. For example, the tools may include work management tools, source code management tools, build orchestration tools, release orchestration tools, and/or the like.

In some embodiments, the process flow 200 may include using the analyzers 204 to analyze rest APIs of the tools 202, analyze engineering functionalities of the tools 202, and/or the like. Additionally, or alternatively, the process flow 200 may include providing, with the analyzers 204, one or more insights, data, and/or the like associated with the rest APIs of the tools 202, the engineering functionalities of the tools 202, engineering methods of the tools 202, and/or the like to the engineering intelligence system 206. For example, the process flow 200 may include storing the one or more insights, data, and/or the like associated with the rest APIs of the tools 202, the engineering functionalities of the tools 202, engineering methods of the tools 202, and/or the like in a data structure.

As shown in FIG. 2, the process flow 200 may include receiving, from the user 208 and with the engineering intelligence system 206, an engineering request. For example, the user 208 may provide the engineering request via a portal, a user interface, submission form, a text box, and/or the like. In some embodiments, the engineering request may include information identifying one or more of the tools 202, information identifying the user 208 (e.g., a user ID and/or the like), information identifying one or more configurations of one or more of the tools 202, information identifying one or more functions of one or more of the tools 202, information identifying a change and/or a functionality that the user 208 would like to make to one or more of the tools 202, and/or the lie. Additionally, or alternatively, the engineering request may include data in a j son format and/or one or more other data formats.

In some embodiments, the engineering intelligence system 206 may use the analyzers 204 to analyze the engineering request, payload data of the engineering request, and/or the like. For example, the analyzers 204 may analyze the payload data to identify one or more tools 202 associated with the engineering request.

In some embodiments, the process flow 200 may include determining, based on information identifying the user 208 (e.g., a user ID and/or the like), whether the user 208 is an authorized user. For example, the engineering intelligence system 206 may determine whether the user 208 is an authorized user based on the information identifying the user 208 in the engineering request and/or based on a data structure including information identifying authorized users.

As shown in FIG. 2, the process flow 200 may include converting, with the converter 210, the engineering request to a desired data format. For example, the engineering intelligence system 206 may use the converter 210 to convert payload data of the engineering request to a desired data format. In some embodiments, the desired data format may correspond to a format compatible with other components of the engineering intelligence system 206 (e.g., the request mapper 212, the API aggregator 214, and/or the like). Additionally, or alternatively, the desired data format may correspond to a format associated with one or more of the tools 202 (e.g., as identified by the analyzers 204 and/or the like). For example, the analyzers 204 may analyze the payload data and determine that the engineering request is associated with a tool requiring two inputs to perform a function, the payload data may include three inputs, and the converter 210 may convert the three inputs in the payload data to two inputs for the tool.

As shown in FIG. 2, the process flow 200 may include mapping, with the request mapper 212, the engineering request to the API aggregator 214. For example, the engineering intelligence system 206 may use the request mapper 212 to map the payload data, the converted data from the converter 210, and/or the like to the API aggregator 214. In some embodiments, the API aggregator 214 may consolidate engineering requests, and with the help of the analyzers 204, identify a target tool, of the tools 202, to process the engineering request by decoding data from the converter 210.

As shown in FIG. 2, the process flow 200 may include mapping, with the API aggregator 214, a final response. For example, the engineering intelligence system 206 may use the API aggregator 214 to map a final response to one or more of the tools 202 based on the engineering request, the information identifying the user 208, the payload data, the converted data, and/or the like. In some embodiments, and as shown in FIG. 2, the process flow may include the engineering intelligence system 206 providing updated configurations to one or more of the tools 202.

In some embodiments, the process flow 200 may include converting the engineering request to a desired configuration of the tools 202 and mapping the engineering request to a final response. For example, the engineering intelligence system 206 may convert, using the analyzers 204, the converter 210, the request mapper 212, and/or the API aggregator 214, the engineering request to a desired configuration of the tools 202 and map, using the analyzers 204, the converter 210, the request mapper 212, and/or the API aggregator 214, the engineering request to a final response. Additionally, or alternatively, the process flow 200 may include abstracting, from the user (e.g., a layperson, a user without engineering knowledge with respect to the tools 202, and/or the like) and/or a user request, engineering configurations and intelligently fulfilling the user request (e.g., using the engineering intelligence system 206). In some embodiments, the process flow 200 may include, using the engineering intelligence system 206, to process configurations and automation manifests by performing tools engineering. In this way, the process flow 200 and/or the engineering intelligence system 206 may provide agility to software management by permitting a user to manage configurations and apply engineering practices set by different tools.

In some embodiments, the process flow 200 and/or the engineering intelligence system 206 may accept a user engineering request and validate the user engineering request through and/or for transformation. Additionally, or alternatively, the process flow 200 and/or the engineering intelligence system 206 may, using the converter 210, accept the user engineering request and covert the user engineering request to a desired data format. In some embodiments, the process flow 200 and/or the engineering intelligence system 206 may include transforming the user engineering request using the analyzers 204, the request mapper 212, and/or the API aggregator 214, to process the user engineering request by decoding data from the converter 210. Additionally, or alternatively, the process flow 200 and/or the engineering intelligence system 206 may fulfill the user engineering request by mapping the user engineering request to a final response with updated configurations in respective tools 202.

Process flow 200 may include additional embodiments, such as any single embodiment or any combination of embodiments described below and/or in connection with one or more other processes described elsewhere herein. Although FIG. 2 shows example blocks of process flow 200, in some embodiments, process flow 200 may include additional blocks, fewer blocks, different blocks, or differently arranged blocks than those depicted in FIG. 2. Additionally, or alternatively, two or more of the blocks of process flow 200 may be performed in parallel.

FIG. 3 illustrates a process flow 300 for dynamically reconfiguring electronic applications based on user requests within a technical environment, in accordance with an embodiment of the invention. In some embodiments, a tools engineering intelligence services system and/or the like (e.g., similar to one or more of the systems described herein with respect to FIG. 1) may perform one or more of the steps of process flow 300.

As shown in block 302, the process flow 300 may include analyzing multiple applications to determine configurations, programming interfaces, functions, and data formats of each application of the applications. For example, a tools engineering intelligence services system may analyze multiple applications to determine configurations, programming interfaces, functions, and data formats of each application of the applications.

As shown in block 304, the process flow 300 may include receiving payload data, where the payload data is based on a user request, and where the user request includes a user identifier associated with a user that provided the user request and information identifying an engineering request. For example, a tools engineering intelligence services system may receive payload data. In some embodiments, the payload data may be based on a user request. Additionally, or alternatively, the user request may include a user identifier associated with a user that provided the user request and information identifying an engineering request.

As shown in block 306, the process flow 300 may include determining, based on the payload data, an application, of the applications, for performing the engineering request. For example, a tools engineering intelligence services system may determine, based on the payload data, an application, of the applications, for performing the engineering request.

As shown in block 308, the process flow 300 may include converting the payload data to a data format, of the data formats, for the application to obtain converted data. For example, a tools engineering intelligence services system may convert the payload data to a data format, of the data formats, for the application to obtain converted data.

As shown in block 310, the process flow 300 may include performing, on the application and based on the converted data, the engineering request. For example, a tools engineering intelligence services system may perform, on the application and based on the converted data, the engineering request.

Process flow 300 may include additional embodiments, such as any single embodiment or any combination of embodiments described below and/or in connection with one or more other processes described elsewhere herein.

In a first embodiment, the engineering request may include information identifying a configuration of the configurations.

In a second embodiment alone or in combination with the first embodiment, the engineering request may include information identifying a function of the functions.

In a third embodiment alone or in combination with any of the first through second embodiments, the process flow 300 may include storing the configurations, programming interfaces, functions, and data formats of each application of the applications in a data structure.

In a fourth embodiment alone or in combination with any of the first through third embodiments, the process flow 300 may include, when determining the application for performing the engineering request, determining the application for performing the engineering request based on the payload data and data in the data structure.

In a fifth embodiment alone or in combination with any of the first through fourth embodiments, the process flow 300 may include, when converting the payload data, converting the payload data based on data in the data structure.

In a sixth embodiment alone or in combination with any of the first through fifth embodiments, the engineering request may include a request to change a configuration of the application, and the process flow 300 may include, when performing the engineering request, changing the configuration of the application.

In a seventh embodiment alone or in combination with any of the first through sixth embodiments, the engineering request may include a request to provide the user with access to the application, and the process flow 300 may include, when performing the engineering request, changing a configuration of application to provide the user with access to the application.

In an eighth embodiment alone or in combination with any of the first through seventh embodiments, the process flow 300 may include performing the engineering request on the application via a programming interface of the programming interfaces.

In a ninth embodiment alone or in combination with any of the first through eighth embodiments, the process flow 300 may include mapping the engineering request to an aggregator.

In a tenth embodiment alone or in combination with any of the first through ninth embodiments, the user request may include information identifying multiple engineering requests, and the process flow 300 may include mapping the engineering requests to an aggregator and consolidating, with the aggregator, the engineering requests.

In an eleventh embodiment alone or in combination with any of the first through tenth embodiments, the process flow 300 may include decoding the converted data.

Although FIG. 3 shows example blocks of process flow 300, in some embodiments, process flow 300 may include additional blocks, fewer blocks, different blocks, or differently arranged blocks than those depicted in FIG. 3. Additionally, or alternatively, two or more of the blocks of process flow 300 may be performed in parallel.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that may direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

What is claimed is:

1. A system for dynamically reconfiguring electronic applications based on user requests, the system comprising:
    at least one non-transitory storage device comprising computer program code stored thereon; and
    at least one processing device coupled to the at least one non-transitory storage device, wherein the at least one processing device is configured to execute the computer program code to:
        analyze multiple applications to determine configurations, programming interfaces, functions, and data formats of each application of the applications, wherein the applications comprise work management tools, source code management tools, build orchestration tools, and release orchestration tools;
        receive a user request via a user interface comprising a text box, wherein the user request comprises payload data, a user identifier associated with a user that provided the user request, and an engineering request comprising information input by the user to the text box requesting a change to a functionality of one or more of the applications;
        determine, based on the payload data and the engineering request, which of the work management tools, the source code management tools, the build orchestration tools, or the release orchestration tools to change to perform the change to the functionality of the one or more of the applications;
        convert the payload data to a data format, of the data formats, for each of the work management tools, the source code management tools, the build orchestration tools, or the release orchestration tools for changing to perform the change to the functionality of the one or more of the applications to obtain converted data; and
        perform, on each of the work management tools, the source code management tools, the build orchestration tools, or the release orchestration tools for changing to perform the change to the functionality of the one or more of the applications and based on the converted data, the engineering request to change the functionality of the one or more of the applications.

2. The system of claim 1, wherein the engineering request comprises information identifying a configuration of the configurations.

3. The system of claim 1, wherein the engineering request comprises information identifying a function of the functions.

4. The system of claim 1, wherein the at least one processing device is further configured to execute the computer program code to store the configurations, programming interfaces, functions, and data formats of each application of the applications in a data structure.

5. The system of claim 4, wherein the at least one processing device is further configured to execute the computer program code to, when determining which of the work management tools, the source code management tools, the build orchestration tools, or the release orchestration tools to change to perform the change to the functionality of the one or more of the applications, determine which of the work management tools, the source code management tools, the build orchestration tools, or the release orchestration tools to change to perform the change to the functionality of the one or more of the applications based on data in the data structure.

6. The system of claim 4, wherein the at least one processing device is further configured to execute the computer program code to, when converting the payload data, covert the payload data based on data in the data structure.

7. The system of claim 1, wherein the engineering request comprises a request to change a configuration of an application, and wherein the at least one processing device is further configured to execute the computer program code to, when performing the engineering request, change the configuration of the application.

8. The system of claim 1, wherein the engineering request comprises a request to provide the user with access to the application, and wherein the at least one processing device is further configured to execute the computer program code to, when performing the engineering request, change a configuration of the application to provide the user with access to the application.

9. The system of claim 1, wherein the at least one processing device is further configured to execute the computer program code to perform the engineering request via a programming interface of the programming interfaces.

10. The system of claim 1, wherein the at least one processing device is further configured to execute the computer program code to map the engineering request to an aggregator.

11. The system of claim 1, wherein the user request comprises information identifying multiple engineering requests, and wherein the at least one processing device is further configured to execute the computer program code to:
    map the engineering requests to an aggregator; and
    consolidate, with the aggregator, the engineering requests.

12. The system of claim 1, wherein the at least one processing device is further configured to execute the computer program code to decode the converted data.

13. A computer program product for dynamically reconfiguring electronic applications based on user requests, the computer program product comprising a non-transitory computer-readable medium comprising code causing a first apparatus to:
- analyze multiple applications to determine configurations, programming interfaces, functions, and data formats of each application of the applications, wherein the applications comprise work management tools, source code management tools, build orchestration tools, and release orchestration tools;
- receive a user request via a user interface comprising a text box, wherein the user request comprises payload data, a user identifier associated with a user that provided the user request, and an engineering request comprising information input by the user to the text box requesting a change to a functionality of one or more of the applications;
- determine, based on the payload data and the engineering request, which of the work management tools, the source code management tools, the build orchestration tools, or the release orchestration tools to change to perform the change to the functionality of the one or more of the applications;
- convert the payload data to a data format, of the data formats, for each of the work management tools, the source code management tools, the build orchestration tools, or the release orchestration tools for changing to perform the change to the functionality of the one or more of the applications to obtain converted data; and
- perform, on each of the work management tools, the source code management tools, the build orchestration tools, or the release orchestration tools for changing to perform the change to the functionality of the one or more of the applications and based on the converted data, the engineering request to change the functionality of the one or more of the applications.

14. The computer program product of claim 13, wherein the engineering request comprises information identifying a configuration of the configurations.

15. The computer program product of claim 13, wherein the engineering request comprises information identifying a function of the functions.

16. The computer program product of claim 13, wherein the non-transitory computer-readable medium comprises code causing the first apparatus to store the configurations, programming interfaces, functions, and data formats of each application of the applications in a data structure.

17. The computer program product of claim 16, wherein the non-transitory computer-readable medium comprises code causing the first apparatus to, when determining which of the work management tools, the source code management tools, the build orchestration tools, or the release orchestration tools to change to perform the change to the functionality of the one or more of the applications, determine which of the work management tools, the source code management tools, the build orchestration tools, or the release orchestration tools to change to perform the change to the functionality of the one or more of the applications based on data in the data structure.

18. The computer program product of claim 16, wherein the non-transitory computer-readable medium comprises code causing the first apparatus to, when converting the payload data, covert the payload data based on data in the data structure.

19. The computer program product of claim 13, wherein the engineering request comprises a request to change a configuration of an application, and wherein the non-transitory computer-readable medium comprises code causing the first apparatus to, when performing the engineering request, change the configuration of the application.

20. A method for dynamically reconfiguring electronic applications based on user requests, the method comprising:
- analyzing multiple applications to determine configurations, programming interfaces, functions, and data formats of each application of the applications, wherein the applications comprise work management tools, source code management tools, build orchestration tools, and release orchestration tools;
- receiving a user request via a user interface comprising a text box, wherein the user request comprises payload data, a user identifier associated with a user that provided the user request, and an engineering request comprising information input by the user to the text box requesting a change to a functionality of one or more of the applications;
- determining, based on the payload data and the engineering request, which of the work management tools, the source code management tools, the build orchestration tools, or the release orchestration tools to change to perform the change to the functionality of the one or more of the applications;
- converting the payload data to a data format, of the data formats, for each of the work management tools, the source code management tools, the build orchestration tools, or the release orchestration tools for changing to perform the change to the functionality of the one or more of the applications to obtain converted data; and
- performing, on each of the work management tools, the source code management tools, the build orchestration tools, or the release orchestration tools for changing to perform the change to the functionality of the one or more of the applications and based on the converted data, the engineering request to change the functionality of the one or more of the applications.

* * * * *